(12) United States Patent
Schirrmann et al.

(10) Patent No.: US 12,366,850 B2
(45) Date of Patent: Jul. 22, 2025

(54) SYSTEM AND METHOD FOR COGNITIVE ASSISTANCE IN AT LEAST PARTIALLY MANUAL AIRCRAFT ASSEMBLY

(71) Applicant: Airbus (S.A.S.), Blagnac (FR)

(72) Inventors: Arnd Schirrmann, Hamburg (DE); Oliver Klaproth, Hamburg (DE); Emmanuelle Dietz, Hamburg (DE)

(73) Assignee: Airbus (S.A.S.), Blagnac (FR)

( * ) Notice: Subject to any disclaimer, the term of this patent is extended or adjusted under 35 U.S.C. 154(b) by 336 days.

(21) Appl. No.: 18/081,320

(22) Filed: Dec. 14, 2022

(65) Prior Publication Data
US 2023/0185288 A1    Jun. 15, 2023

(30) Foreign Application Priority Data
Dec. 15, 2021 (EP) .................................. 21214938

(51) Int. Cl.
*B25J 9/16* (2006.01)
*G05B 19/418* (2006.01)

(52) U.S. Cl.
CPC ........ *G05B 19/41865* (2013.01); *B25J 9/163* (2013.01); *B25J 9/1676* (2013.01);
(Continued)

(58) Field of Classification Search
USPC .................................................. 700/245–264
See application file for complete search history.

(56) References Cited

U.S. PATENT DOCUMENTS 10,046,381 B2 * 8/2018 Oberoi .................. B25J 9/1697
10,083,627 B2 * 9/2018 Daniel ................... G09B 19/24
(Continued)

FOREIGN PATENT DOCUMENTS

EP             3 591 521 A1      1/2020
WO      WO-2019186146 A1 * 10/2019 .............. B25J 13/08

OTHER PUBLICATIONS

Johannes Hocherl et al, "Smart Workbench: Toward Adaptive and Transparent User Assistance in Industrial Human-Robot Application," http://ieeexplore.ieee.org/stampPDF, Jun. 21, 2016.
(Continued)

*Primary Examiner* — Jonathan L Sample
(74) *Attorney, Agent, or Firm* — KDW Firm PLLC (57) ABSTRACT

A system for cognitive assistance in aircraft assembly includes a system to monitor an aircraft assembly process and acquire physical and physiological data on a human worker performing assembly operations. A cognitive model of the human worker on a data-processing device is coupled to the monitoring system to receive acquired physical and physiological data of the human worker, the cognitive model configured to provide state information on the human worker and prognostic data on expected behavior of the human worker during the aircraft assembly process. The state information and the prognostic data are continuously updated during the aircraft assembly process. A system control is coupled to the monitoring system and the cognitive model to assess current state of the aircraft assembly process based on the monitored aircraft assembly process, the state information of the of the human worker and the prognostic data of the cognitive model.

18 Claims, 2 Drawing Sheets

(52) U.S. Cl.
CPC .............. *G05B 2219/40202* (2013.01); *G05B 2219/40414* (2013.01)

(56) References Cited

U.S. PATENT DOCUMENTS

| | | | |
|---|---|---|---|
| 10,815,679 B2 * | 10/2020 | Miller | B25J 9/0084 |
| 11,351,680 B1 * | 6/2022 | Rosenberg | B25J 19/0095 |
| 11,500,462 B2 * | 11/2022 | Duarte De Oliveira | G06F 3/0346 |
| 2017/0063881 A1 * | 3/2017 | Doganata | H04L 63/10 |
| 2018/0099411 A1 * | 4/2018 | Ayusawa | B25J 9/1697 |
| 2019/0105779 A1 * | 4/2019 | Einav | B25J 9/1689 |
| 2020/0070340 A1 * | 3/2020 | Kurtz | B25J 9/1664 |
| 2020/0254630 A1 * | 8/2020 | Miller | H02G 11/00 |
| 2020/0398422 A1 * | 12/2020 | Yufik | B25J 9/163 |
| 2021/0146546 A1 * | 5/2021 | Linkowski | B25J 9/1676 |
| 2021/0170590 A1 * | 6/2021 | Laftchiev | B25J 9/163 |
| 2021/0173377 A1 * | 6/2021 | Laftchiev | G05B 13/0265 |
| 2021/0373664 A1 * | 12/2021 | Duarte De Oliveira | G06F 3/015 |
| 2022/0019204 A1 * | 1/2022 | Maury | G06F 30/27 |
| 2022/0226994 A1 * | 7/2022 | Gombolay | B25J 9/1682 |
| 2023/0086122 A1 * | 3/2023 | Gombolay | G05B 19/401 700/186 |

OTHER PUBLICATIONS

European Search Report for Application No. 21214938 dated May 19, 2022.

* cited by examiner

SYSTEM AND METHOD FOR COGNITIVE ASSISTANCE IN AT LEAST PARTIALLY MANUAL AIRCRAFT ASSEMBLY

TECHNICAL FIELD

The disclosure herein pertains to a system and a method for cognitive assistance in at least partially manual aircraft assembly.

BACKGROUND

Aircraft assembly, especially equipment and system installation and cabin assembly, is still largely manual, little automated and therefore very personnel intensive. The majority of assembly work usually requires more than one assembly worker, e.g. to assist in holding and fastening long, large or bulky components. Due to the high degree of customer-specific product variants, automation by conventional industrial robotics (complete automation, relying on encapsulation without collaboration with workers) or the support of workers by todays collaborative assistance systems (e.g. collaborative robots) is very difficult.

The partial replacement of human teammates and/or the assistance of assembly worker teams by automation solutions like collaborative robots is hindered by the inflexibility and limitations of actual existing solutions. Control systems of today's collaborative robots are often unable to handle the prediction and incorporation of human behavior in complex assembly situations. In consequence, the interaction and collaboration between human and digital co-workers in assembly operations may tend to be insufficient and error- and/or accident-prone.

The highly demanding requirements on the quality of the assembled components pose another hurdle, as laborious quality inspections need to be conducted during and/or after assembly. Completeness and correctness of assembly work have to be proven by post-assembly inspections and have to be documented in the quality management system. Post-process finding creates additional work for fixing any quality issues.

In-process inspections by teaming assembly worker and quality inspectors are difficult and costly. Automated quality inspections by assistance systems may be limited in terms of flexibility and adaptability for product variant differences and/or assembly worker inducted behavioral deviations. Furthermore, the interaction of those assistance systems with the assembly worker may be too narrow and not proactive. Non-normative execution of the assembly tasks, e.g. deviations from assembly sequences, may not be anticipated. Consequentially, the interaction and collaboration between human assembly worker and digital quality assistance and control solutions may be insufficient and/or error-prone.

Frameworks for modelling and prediction of human cognitive behavior, state and intention by computational models are known in the scientific community (e.g. cognitive architectures such as Adaptive Control of Thought-Rational, ACT-R). These are already used in some technical applications for tracking of the cognitive state, e.g. of car drivers. Further recently researched applications include cognitive robotics and human robot interaction. While collaborative robotics is state of the art, conventional solutions may be limited in terms of flexibility, the employed control system being deterministic and limited in terms of responsiveness to human behavior.

SUMMARY

Against this background, it is an object of the disclosure herein to find solutions for aircraft assembly and quality control with increased efficiency and flexibility and having enhanced automation potential.

This object is achieved by a system and a method disclosed herein.

According to an aspect of the disclosure herein, a system for cognitive assistance in at least partially manual aircraft assembly comprises a monitoring system configured to monitor an aircraft assembly process and acquire physical and physiological data on a human worker performing assembly operations as part of the aircraft assembly process; a cognitive model of the human worker implemented on a data-processing device and communicatively coupled to the monitoring system to receive the acquired physical and physiological data of the human worker, wherein the cognitive model is configured to provide state information on the human worker and prognostic data on the expected behavior of the human worker during the aircraft assembly process based on the acquired physical and physiological data, wherein the state information and the prognostic data are continuously updated during the aircraft assembly process; and a system control communicatively coupled to the monitoring system and the cognitive model and configured to assess a current state of the aircraft assembly process based on the monitored aircraft assembly process, the state information of the of the human worker and the prognostic data of the cognitive model.

According to a further aspect of the disclosure herein, a method for cognitive assistance in at least partially manual aircraft assembly comprises monitoring an aircraft assembly process with a monitoring system, wherein the monitoring system acquires physical and physiological data on a human worker performing assembly operations as part of the aircraft assembly process; providing state information on the human worker and prognostic data on the expected behavior of the human worker during the aircraft assembly process with a cognitive model based on the acquired physical and physiological data, wherein the state information and the prognostic data are continuously updated during the aircraft assembly process; and assessing a current state of the aircraft assembly process with a system control based on the monitored aircraft assembly process, the state information of the of the human worker and the prognostic data of the cognitive model.

Thus, one idea of the disclosure herein is to provide an assembly control system that has a joint perception with its human collaborator based on a model of the human behavior and the capability to predict and/or anticipate human acting when faced with complicated tasks that may change frequently. On this basis, the disclosure herein lays the foundation to overcome various challenges in teaming human assembly workers, collaborative automation solutions and in-process quality inspection and assistance. The control system of the disclosure herein is able to react in a more flexible and adapted way than common systems. In order to achieve this, the disclosure herein proposes to use cognitive models of the human co-worker in control systems of aircraft assembly. Such cognitive models provide information on the human state and can predict or anticipate how a human worker will act during collaborative assembly activities and thus can enable the control system to dynamically adapt a control program to human behavior. The disclosure herein includes the use of monitoring of the assembly execution and of physical and physiological parameters of the human worker (e.g. motion capturing, EEG, eye tracking etc.) to adapt the cognitive model to the individual during assembly operations and to update the state information and behavior prediction while the assembly is progressing.

The disclosure herein amongst others improves the flexibility and reactivity of collaborative assistance solutions in complex assembly scenarios. The use of cognitive models for the incorporation of human cognitive state and behaviour prediction will enable the partial automation of manual assembly operations as well as the in-process automation of quality control by improvement of acceptance and safety. The use of automation can reduce labor costs and improve the quality of assembly operations in various stages of the assembly process of aircraft.

Advantageous embodiments and improvements of the subject matter are disclosed herein.

According to an embodiment of the disclosure herein, the system may further comprise an assistance system configured to execute assembly operations in collaboration with the human worker as part of the aircraft assembly process based on control commands provided by the system control. The system control may be configured to dynamically adapt the control commands based on the current state of the aircraft assembly process. The method may correspondingly comprise executing the assembly operations with the assistance system in collaboration with the human worker as part of the aircraft assembly process based on the control commands provided by the system control.

The disclosure herein thus extends the classical assistance system in the aircraft assembly scenario based on collaborative units like robots or similar with a cognitive model able to provide additional, continuous and real-time information about the human co-worker cognitive state (actual recognition the assembly situation, assistance system actual and planned activities) and to predict the intention of the human co-worker (next activities, expected next behavior of the assistance system).

The provided information can be used by the system control for adaptation and updating the programed assistance tasks, e.g. by changing the sequence or assignment of activities in the collaborative assembly scenario (e.g. taking the task to provide material and/or tools initially assigned to the human co-worker). During the operation of the assistance system the cognitive model is continuous adapted according to the actually observed actions by the environment and/or co-worker. The updated model allows the system to change its (own) intended actions realized by the collaborative assistance units (robots, actors, agents etc.) and communicate and/or display an inconsistency and/or exception in the process to the human co-worker.

The proactive reaction to human co-workers' intentions will significantly speed-up the reaction of the assistance system able to interact with the human co-worker in an intuitive way (e.g. such that a smooth interaction between both is possible). Ideally, the worker would behave similarly as if she or he would interact with another human worker. Mismatch of assistance system behavior with human co-worker expectations will be reduced and/or completely prevented and resulting safety issues in close human-robot interaction will be reduced.

According to an embodiment of the disclosure herein, the assistance system may comprise at least one industrial robot configured to act in collaboration with the human worker.

Hence, the disclosure herein may be particularly used in a collaborative assembly environment where humans and (industrial) robots are collaborating directly or indirectly on various assembly tasks.

According to an embodiment of the disclosure herein, the system may further comprise a computer-based assembly management system communicatively coupled to the system control and the cognitive model and configured to provide assembly work orders based on assembly tasks to be carried out. The cognitive model may be configured to take the assembly work orders into account for the provision of the state information and the prognostic data.

The system control may thus be connected, for example, to a Manufacturing Execution System (MES) and/or a Production Planning System (PPS) to receive the assembly work orders. The work order from MES and/or PPS may then also be used by the cognitive model as input to update the cognitive model for the specific work order needs.

According to an embodiment of the disclosure herein, the assembly work orders may include initial control commands for the assistance system.

The work orders from the MES and/or PPS may thus include control programs for the assistance system (e.g. a collaborative robot control program) defining the various assembly tasks. The respective control commands then get dynamically adapted by the system control if necessary based on the data incoming from the monitoring system and the cognitive model.

According to an embodiment of the disclosure herein, the system control may be configured to determine quality characteristics of the aircraft assembly process by comparing the current state of the aircraft assembly process with an assembly plan. The method may correspondingly comprise determining quality characteristics of the aircraft assembly process with the system control by comparing the current state of the aircraft assembly process with the assembly plan.

Hence, the disclosure herein may not only be used to handle the (collaborative) execution of the actual assembly operations. Alternatively, or additionally, digital assistance according to the disclosure herein may also be used for in-process quality control for complex, partially or mainly manual assembly operations (e.g. installations at aircraft engines, cabin installations) enhanced by a cognitive model of the assembly worker. The cognitive model may be used by the automated, digital quality control solution to provide additional, continuous and real-time information about the human worker cognitive state (actual recognition of the assembly situation, actual and planned worker activities) and to predict the intention of the human worker (next activities).

The provided information may be used by the system control to compare the human assembly worker actions and assembly progress with the normative assembly plan and results in terms of completeness and quality. While complex assembly operations allowing different sequences in execution the overall work, the normative preplanning (assembly task sequences) may deviate from execution sequence as chosen by each individual human assembly worker. The digital system can observe the validity of those individual deviations of the assembly execution and can notify the human assembly worker during the assembly process about critical deviations and quality related consequences.

The cognitive model of the assembly worker is used within the system for representation of the workers intention and possibilities for actions. The cognitive model does not necessarily need a complete pre-calculated set of possible assembly sequences but may be able to predict possible actions on basis of the human worker state and assembly task progress. Thereby, the system enables the in-process quality assessment of manual assembly operations observing the assembly operation similarly to a human assistant/worker.

According to an embodiment of the disclosure herein, the system control may be configured to issue a notification to the human worker providing information on the determined quality characteristics of the aircraft assembly process.

For example, a display or portable computing device may be used as an interface for the human workers by which means the system is able to provide in-process warnings and recommendations to the workers. In principle, it may also receive input from the workers via such an interface. It is to be understood however that also alternative or supplementary technical means may be used for this purpose, e.g. voice input and/or output.

According to an embodiment of the disclosure herein, the system control may be configured to adapt the control commands for the assistance system based on the determined quality characteristics of the aircraft assembly process.

Hence, the system is able to initiate suitable countermeasures in case that some aspects of the assembly process do not meet the expected standards and/or requirements. In the present case, the system is able to intervene basically immediately, that is, during the assembly process without first having to wait for manual and laborious quality inspections, which often can only be executed at a later point in time.

According to an embodiment of the disclosure herein, the system may further comprise a human-machine interface configured to provide information on the current state of the aircraft assembly process, the state information of the human worker, the prognostic data of the cognitive model and/or planned activities for the aircraft assembly process. Alternatively, or additionally, the human-machine interface may be configured to receive input data from the human worker for the system control.

Hence, an interface, e.g. a (touch) display, a tablet or any other portable computer, can be used for presentation of information to the human worker and/or feedback back towards the system control and/or the assistance system. However, a display or computing device may not even be required for this purpose. Alternatively, or additionally, voice interaction may be used for example to facilitate the exchange of information and/or of control commands between the human worker and the system. Such an interface may amongst others provide information from the system control to the human worker about the recognized human state, the prognostic data as well as planned upcoming activities of the assistance systems.

According to an embodiment of the disclosure herein, the human-machine interface may be communicatively coupled with the cognitive model to share information about interactions between the human-worker and the human-interface with the cognitive model.

Hence, any interaction of the human worker with the interface can also be subject to monitoring and can be used as an input for cognitive state assessments by the cognitive model.

The disclosure herein will be explained in greater detail with reference to example embodiments depicted in the drawings as appended.

BRIEF DESCRIPTION OF THE DRAWINGS

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

Figure 1:
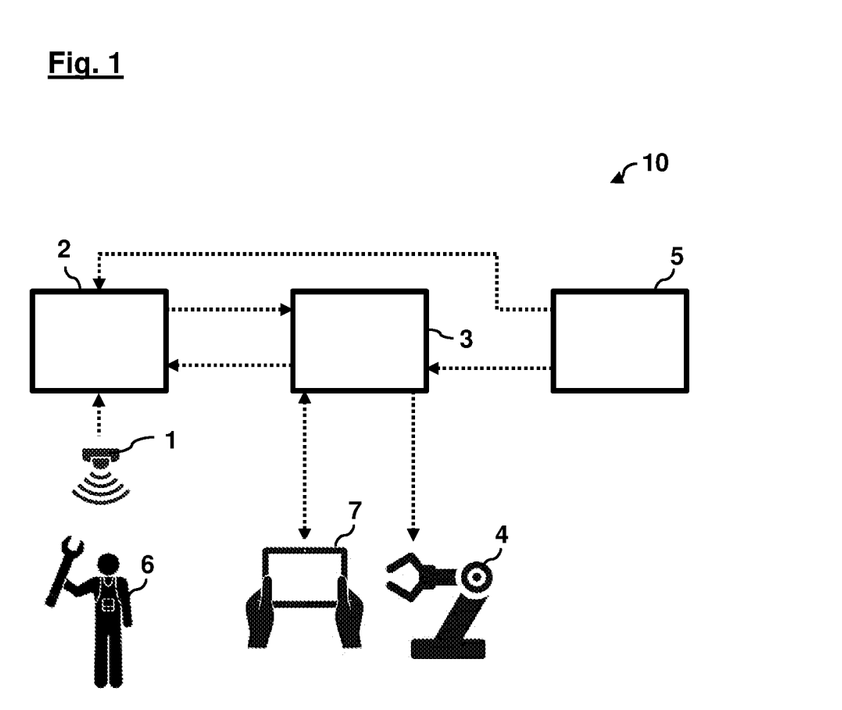
FIG. 1 shows a schematic view of a system for cognitive assistance in aircraft assembly according to an embodiment of the disclosure herein.
Figure 2:
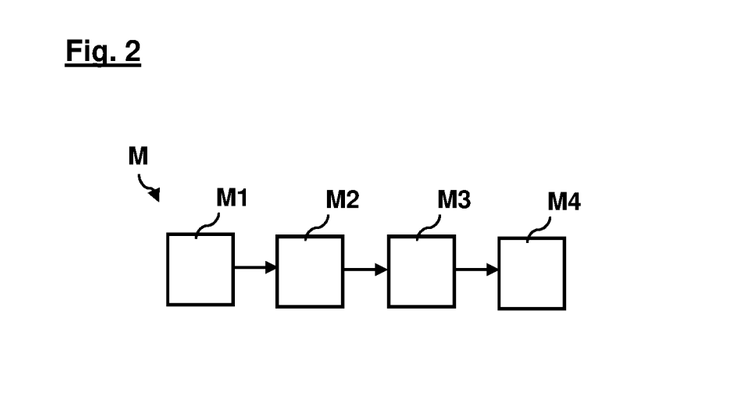
FIG. 2 shows a schematic flow diagram of a method for cognitive assistance using the system of FIG. 1.

FIG. 1 shows a schematic view of a system 10 for cognitive assistance in aircraft assembly according to an embodiment of the disclosure herein. FIG. 2 shows a schematic flow diagram of a method M for cognitive assistance using the system of FIG. 1.

The system 10 of this embodiment is built on a collaborative assembly system, in which at least one human worker 6 acts in collaboration with an assistance system 4 of at least one industrial robot supporting the assembly operation of the one or several human workers 6. The system 10 is controlled by a computer-based system control 3, which provides control commands for the assistance system 4 to execute assembly operations in collaboration with the human worker 6 as part of the aircraft assembly process.

The depicted system 10 is enhanced over conventional systems by its reliance on a cognitive system architecture, which enables a better understanding and prediction of the collaboration between humans and robots during the assembly and which therefore can be used to improve the overall assembly process, as will be explained in the following.

The system 10 comprises a monitoring system 1 configured to monitor the aircraft assembly process and acquire physical and physiological data on the human workers 6 performing assembly operations as part of the aircraft assembly process. To this end, the monitoring system 1 may include various sensors, e.g. video observation for observing the assembly process and/or physiological sensors like EEG, eye tracking and so on for determining human cognitive state.

The system 10 further comprises a computer-implemented cognitive model 2 of the human worker 6 that is communicatively coupled to the monitoring system 1 to receive the acquired physical and physiological data of each human worker 6. The cognitive model 2 is configured to provide state information on the human worker 6 and prognostic data on the expected behavior of the human worker 6 during the aircraft assembly process based on the acquired physical and physiological data. The state information and the prognostic data are continuously updated during the aircraft assembly process.

The system control 3 is communicatively coupled to the monitoring system 1 and the cognitive model 2 and configured to assess a current state of the aircraft assembly process based on the monitored aircraft assembly process, the state information of the of the human worker 6 and the prognostic data of the cognitive model 2. The system control 3 dynamically adapts the control commands based on the current state of the aircraft assembly process.

Hence, based on the measurements of the monitoring system 1, the state, planned activities and intentions of the human co-workers 6 are continuously processed and evaluated by the cognitive model 2, which is in constant interaction with the control system 3 for updating and the sending the control commands to the assistance system 4.

The system 10 further comprises a computer-based assembly management system 5, e.g. a Manufacturing Execution System (MES) and/or Production Planning System (PPS), communicatively coupled to the system control 3 and the cognitive model 2 and configured to provide assembly work orders based on assembly tasks to be carried out. The cognitive model 2 is configured to take the assembly work orders into account for the provision of the state information and the prognostic data. These assembly work orders also include initial control commands for the assistance system 4, e.g. commands from a collaborative robot control program, which then get continuously and dynamically updated by the system control 3 depending on the actual assembly operations.

The system 10 of this example embodiment further comprises a human-machine interface 7, e.g. a touch display, a portable computer or similar, which is configured to provide various information to the human workers 6 and optionally receive input and/or commands from them. Such information may comprise amongst others information on the current state of the aircraft assembly process, the state information of the human workers 6, the prognostic data of the cognitive model 2 and/or planned activities for the aircraft assembly process.

The cognitive model 2 represents the core element of the system 10 and can be described as a subsystem implementing a cognitive model based on modules describing human cognitive states, knowledge, input sources and processes (e.g. following the ACT-R architecture or a similar computer-implemented realization of cognitive models) for the computation of the cognitive state and intentions of the modeled human. The cognitive model 2 may include modules for knowledge (declarative modules—DM), for processing knowledge (production modules—PM) including modules for visual, motoric or speech processing. The inputs for instantiation the cognitive model 2 of the human worker in a specific assembly situation may comprise the assembly order, the actual state and the planned actions of the collaborative entity (assistance system 4, i.e. the collaborative robot or robots) that can be manipulated by the human worker 6, depending on the task that needs to be carried out.

The cognitive model 2 is able to process the cognitive state and future behavior of the modeled human. Along the assembly process the cognitive model 2 is updated about the results of human actions, external impact (e.g. by the assistance system 4) to the assembly scene, etc. The monitoring system 1 and the system control 3 continuously provide the needed observations and status information of the outside world to be incorporated in the cognitive model update.

The corresponding method M comprises with reference to FIG. 2 under M1 monitoring the aircraft assembly process with the monitoring system 1. The method M further comprises under M2 providing the state information on the human worker 6 and the prognostic data on the expected behavior of the human worker 6 during the aircraft assembly process with the cognitive model 2 based on the acquired physical and physiological data. The method M further comprises under M3 assessing the current state of the aircraft assembly process with the system control 3 based on the monitored aircraft assembly process, the state information of the of the human worker 6 and the prognostic data of the cognitive model 2. Finally, the method M comprises under M4 executing the assembly operations with the assistance system 4 in collaboration with the human worker 6 as part of the aircraft assembly process based on the control commands provided by the system control 3.

Thus, in a more specific example of the typical workflow, the assembly management system 5 may start the assembly operation by transmitting the work order and included robot control programs to the system control 3 and the assistance system 4 as well as the cognitive model 2. The cognitive model 2 will be updated and specific information for the assembly work order will be added to the modules of the cognitive model 2. The cognitive state and first intention of the human worker 6 will then be derived. The system control 3 receives the control program for the assembly work order (as part of the work order received from the assembly management system 5). The human worker 6 and the assistance system 4 then execute the first assembly operation in collaboration.

Based on the observations from the monitoring system 1 and the transmitted status and behavior information from the system control 3, the cognitive model 2 of the human worker 6 is updated and the cognitive state and intention of the human worker 6 is calculated and sent to the system control 3 for processing. The system control 3 updates the control program in accordance to the assembly progress and human worker 6 state and behavior prediction transmitted by the cognitive model 2 and sends out new control commands to the assistance system 4. Optional further information can be provided and/or requested to and/or from the human worker 6 by the human-machine interface 7. Subsequent assembly operations are executed by the human worker 6 and assisted by the assistance system 4 until the assembly work order is completed (loop of the assembly operation).

As a result, the system 10 significantly improves the flexibility and reactivity of collaborative assistance solutions for human-robot teaming in complex assembly scenarios. The use of cognitive models for the incorporation of human cognitive state and behavior prediction enables the partial automation of manual assembly operations by improvement of acceptance and safety. The use of automation can reduce labor costs and improve the quality of assembly operations all stages of the assembly.

Figure 3:
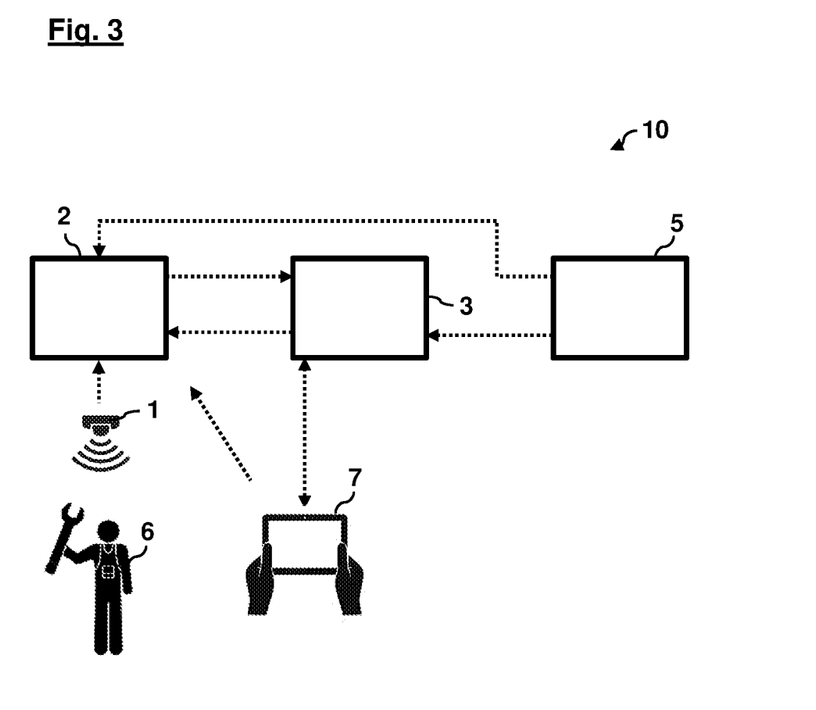
FIG. 3 shows a schematic view of a system for cognitive assistance in aircraft assembly according to another embodiment of the disclosure herein.
Figure 4:
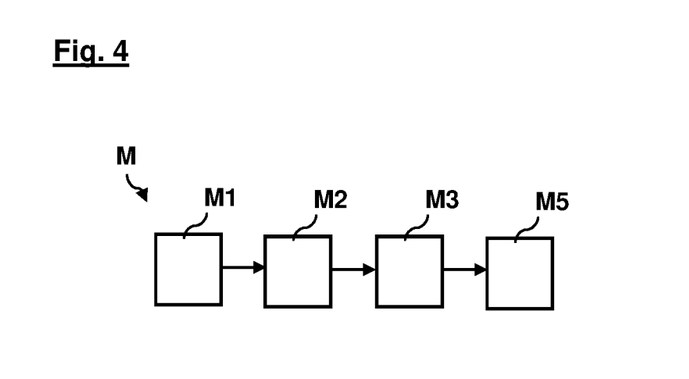
FIG. 4 shows a schematic flow diagram of a method for cognitive assistance using the system of FIG. 3.

With reference to FIGS. 3 and 4 an alternative system 10 and method M for cognitive assistance in aircraft assembly according to another embodiment of the disclosure herein are described.

The system 10 and method M basically correspond to the system 10 and method M described with reference to FIGS. 1 and 2. However, in this case the cognitive approach is not utilized for collaborative assembly of human co-workers and robots. Instead, the system 10 is used for in-process and real-time quality inspection of a largely manual assembly process. It is to be understood however that this approach can also be combined with the one described with reference to FIGS. 1 and 2, that is, the quality control described below with reference to FIGS. 3 and 4 can also be employed for collaborative assembly based on human co-workers and robots.

Thus, in the example embodiment of FIG. 3, the system 10 does not comprise an assistance system (e.g. robots). Instead, the manual assembly process performed by one or several human workers 6 is monitored and controlled. To this end, the system 10 again comprises a system control 3 in communication with an assembly management system 5, a monitoring system 1, a cognitive model 2 and a human-machine interface 7 as before.

The system control 3 of this embodiment is configured to determine quality characteristics of the aircraft assembly process by comparing the current state of the aircraft assembly process with an assembly plan. The system control 3 is then able to issue a notification to the human worker 6 via the human-machine interface 7 providing information on the determined quality characteristics of the aircraft assembly process and optionally to receive input from the human worker 6. The system control 3 also adapts the control commands for the assistance system 4 based on the determined quality characteristics of the aircraft assembly process. The human-machine interface 7 of this embodiment is communicatively coupled with the cognitive model 2 to share information about interactions between the human-worker 6 and the human-machine interface 7 with the cognitive model 2. In that vein, also the interaction between the human workers 6 and the system 10 via the interface 7 can serve as input for the quality evaluation and control.

Hence, in this embodiment the measurements of the human workers state and intentions are computed by the cognitive model 2 and sent back to the system control 3 for assessment the consequences of work progress on quality. Via the interface 7 the system control 3 is able to provide in-process warnings and recommendations to the workers 6. The cognitive model 2 and the system control 3 are connected to the management system 5 triggering the start of assembly tasks and expecting the results of task execution and quality control. The management system 5 provides the necessary information about the assembly tasks and quality control requirements to the cognitive model 2 and the system control 3 and expects the results of quality measurements for further use (e.g. reporting).

Thus, in a more specific example of the typical workflow, the assembly management system 5 may start the assembly operation by transmitting the work orders to the system control 3 and the cognitive model 2. The cognitive model 2 gets updated and specific information for the assembly work order will be added to the modules of the cognitive model 2. The cognitive status and first intention of the human worker 6 will be derived. The human worker 6 then executes the first assembly operation.

Based on the observations from the monitoring system 1 the cognitive model 2 of the human worker 6 is updated and the cognitive state and intention of the human worker 6 is calculated and sent to the system control 3 for processing. The system control 3 evaluates the execution of the assembly work, human worker 6 state and behavior prediction (next actions) in relation to quality. Optional further information can be provided and/or requested to and/or from the human worker by the interface 7. Subsequent assembly operations are executed by the human worker 6 until the assembly work order is completed (loop of the assembly operation). Finally, a quality report for the completed order is communicated to the management system 5.

In this vein, the flexibility of quality assistance solutions for humans in complex assembly scenarios is significantly improved. The use of cognitive models for the incorporation of human cognitive state and behavior prediction enables the in-process automation of quality control by improvement of acceptance and safety.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the disclosure herein and its practical applications, to thereby enable others skilled in the art to best utilize the disclosure herein and various embodiments with various modifications as are suited to the particular use contemplated.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 monitoring system
2 cognitive model
3 system control
4 assistance system
5 assembly management system
6 human worker
7 human-machine interface
10 System for cognitive assistance M method
M1-M5 method steps

The invention claimed is:

1. A system for cognitive assistance in at least partially manual aircraft assembly, comprising:
   a monitoring system configured to monitor an aircraft assembly process and acquire physical and physiological data on a human worker performing assembly operations as part of the aircraft assembly process;
   a cognitive model of the human worker implemented on a data-processing device and communicatively coupled to the monitoring system to receive the acquired physical and physiological data of the human worker, wherein the cognitive model is configured to provide state information on the human worker and prognostic data on expected behavior of the human worker during the aircraft assembly process based on the acquired physical and physiological data, wherein the state information and the prognostic data are continuously updated during the aircraft assembly process;
   a computer-based assembly management system communicatively coupled to the cognitive model and configured to provide assembly work orders based on assembly tasks to be carried out, wherein the cognitive model is configured to take the assembly work orders into account for provision of the state information and the prognostic data;
   a system control communicatively coupled to the monitoring system, the assembly management system, and the cognitive model and configured to assess a current state of the aircraft assembly process based on the monitored aircraft assembly process, progress of the assembly tasks to be carried out, the state information of the of the human worker and/or the prognostic data of the cognitive model; and
   a human-machine interface configured to present information from the system control to the human worker and to receive input data the human worker that is provided to the system control.

2. The system according to claim 1, comprising an assistance system configured to execute assembly operations in collaboration with the human worker as part of the aircraft assembly process based on control commands provided by the system control, wherein the system control is configured to dynamically adapt the control commands based on the current state of the aircraft assembly process.

3. The system according to claim 2, wherein the assistance system comprises at least one industrial robot configured to act in collaboration with the human worker.

4. The system according to claim 1, wherein the assembly work orders include initial control commands for the assistance system.

5. The system according to claim 1, wherein the system control is configured to determine quality characteristics of the aircraft assembly process by comparing the current state of the aircraft assembly process with an assembly plan.

6. The system according to claim 5, wherein the system control is configured to issue a notification to the human-machine interface to provide the human worker with information on the determined quality characteristics of the aircraft assembly process.

7. The system according to claim 5, wherein the system control is configured to adapt the control commands for the assistance system based on the determined quality characteristics of the aircraft assembly process.

8. The system according to claim 1,
   wherein the human-machine interface is configured to provide to the human worker at least one of:
   information on the current state of the aircraft assembly process;
   the prognostic data of the cognitive model; and
   planned activities for the aircraft assembly process.

9. The system according to claim 8, wherein the human-machine interface is communicatively coupled with the cognitive model to share information about interactions between the human-worker and the human-machine interface with the cognitive model.

10. A method for cognitive assistance in at least partially manual aircraft assembly, comprising:
    monitoring an aircraft assembly process with a monitoring system, wherein the monitoring system acquires physical and physiological data on a human worker performing assembly operations as part of the aircraft assembly process;
    providing state information on the human worker and prognostic data on expected behavior of the human worker during the aircraft assembly process with a cognitive model based on the acquired physical and physiological data, wherein the state information and the prognostic data are continuously updated during the aircraft assembly process;
    providing assembly work orders based on assembly tasks to be carried out, wherein the cognitive model takes the assembly work orders into account for provision of the state information and the prognostic data;
    assessing a current state of the aircraft assembly process with a system control based on the monitored aircraft assembly process, progress of the assembly tasks to be carried out, the state information of the of the human worker and/or the prognostic data of the cognitive model;
    presenting information from the system control to a human-machine interface accessible to the human worker;
    receiving input data at the human-machine interface from the human worker; and
    providing the input data from the human worker to the system control.

11. The method according to claim 10, further comprising:
    executing assembly operations with an assistance system in collaboration with the human worker as part of the aircraft assembly process based on control commands provided by the system control, wherein the system control dynamically adapts the control commands based on the current state of the aircraft assembly process.

12. The method according to claim 11, wherein the assistance system comprises at least one industrial robot acting in collaboration with the human worker.

13. The method according to claim 10, wherein the assembly work orders include initial control commands for the assistance system.

14. The method according to claim 10, comprising:
    determining quality characteristics of the aircraft assembly process with the system control by comparing the current state of the aircraft assembly process with an assembly plan.

15. The method according to claim 14, wherein presenting information to the human-machine interface comprises issuing a notification to the human worker providing information on the determined quality characteristics of the aircraft assembly process.

16. The method according to claim 14, wherein the system control adapts the control commands for the assistance system based on the determined quality characteristics of the aircraft assembly process.

17. The method according to claim 10, wherein presenting information to the human-machine interface comprises providing to the human worker at least one of:
   information on the current state of the aircraft assembly process;
   the state information of the human worker;
   the prognostic data of the cognitive model; and
   planned activities for the aircraft assembly process.

18. The method according to claim 17, wherein the human-machine interface shares information about interactions between the human-worker and the human-machine interface with the cognitive model.

* * * * *